(12) United States Patent
Oetiker et al.

(10) Patent No.: US 6,598,269 B2
(45) Date of Patent: Jul. 29, 2003

(54) HOSE CLAMP

(75) Inventors: Hans Oetiker, Horgen (CH); Ulrich Meier, Waedenswil (CH)

(73) Assignee: Hans Oetiker AG Maschinen- und Apparatefabrik (CH)

( * ) Notice: Subject to any disclaimer, the term of this patent is extended or adjusted under 35 U.S.C. 154(b) by 0 days.

(21) Appl. No.: 10/168,330

(22) PCT Filed: Sep. 13, 2001

(86) PCT No.: PCT/EP01/10598

§ 371 (c)(1),
(2), (4) Date: Jun. 20, 2002

(87) PCT Pub. No.: WO02/27231

PCT Pub. Date: Apr. 4, 2002

(65) Prior Publication Data

US 2002/0189055 A1 Dec. 19, 2002

(30) Foreign Application Priority Data

Sep. 13, 2001 (EP) .............................. 00120930

(51) Int. Cl.[7] .......................... B65D 63/02; F16L 33/02
(52) U.S. Cl. .................................. 24/20 CW; 24/20 R
(58) Field of Search ............................... 24/20 R, 23 R, 24/20 CW, 271, 273, 23 EE, 22

(56) References Cited

U.S. PATENT DOCUMENTS

| 3,981,049 A | | 9/1976 | Oetiker |
| 4,299,012 A | | 11/1981 | Oetiker |
| 4,402,113 A | * | 9/1983 | Smith .......................... 24/20 R |
| 4,711,001 A | | 12/1987 | Oetiker |
| 4,742,600 A | * | 5/1988 | Calmettes et al. .......... 24/20 R |
| 4,919,682 A | * | 4/1990 | Bellazzi ....................... 24/20 R |
| 4,991,266 A | * | 2/1991 | Oetiker ........................ 24/20 R |
| 5,048,776 A | * | 9/1991 | Weiss ................. 24/20 CW X |
| 5,177,836 A | | 1/1993 | Kemmerich |
| 5,305,499 A | * | 4/1994 | Oetiker ....................... 24/20 R |
| 5,339,496 A | | 8/1994 | Oetiker |
| 5,669,113 A | * | 9/1997 | Fay ........................ 24/20 CW |

FOREIGN PATENT DOCUMENTS

| DE | 3818953 A1 | 7/1989 |
| EP | 0697554 A1 | 2/1996 |
| EP | 1106895 A1 | 6/2001 |

* cited by examiner

Primary Examiner—Robert J. Sandy
(74) Attorney, Agent, or Firm—Barnes & Thornburg

(57) ABSTRACT

In an open hose clamp with overlapping band ends, the outer band part comprises, starting from its end, an opening, an undulation, an Oetiker ear, an aperture, and a hook, while the inner band part comprises, starting from its end, a hook for engagement in the opening, a smooth area spanning the undulation and the ear, and a tongue with an attachment which passes through the aperture. The attachment serves to guide the tongue in the aperture and thus to ensure correct mutual positioning of the two band parts, transverse to the longitudinal direction of the band, in addition to securing the hose clamp in the engaged state, and cooperating with the hook provided on the outer band part for opening the tightened clamp.

19 Claims, 3 Drawing Sheets

HOSE CLAMP

Figure 1:
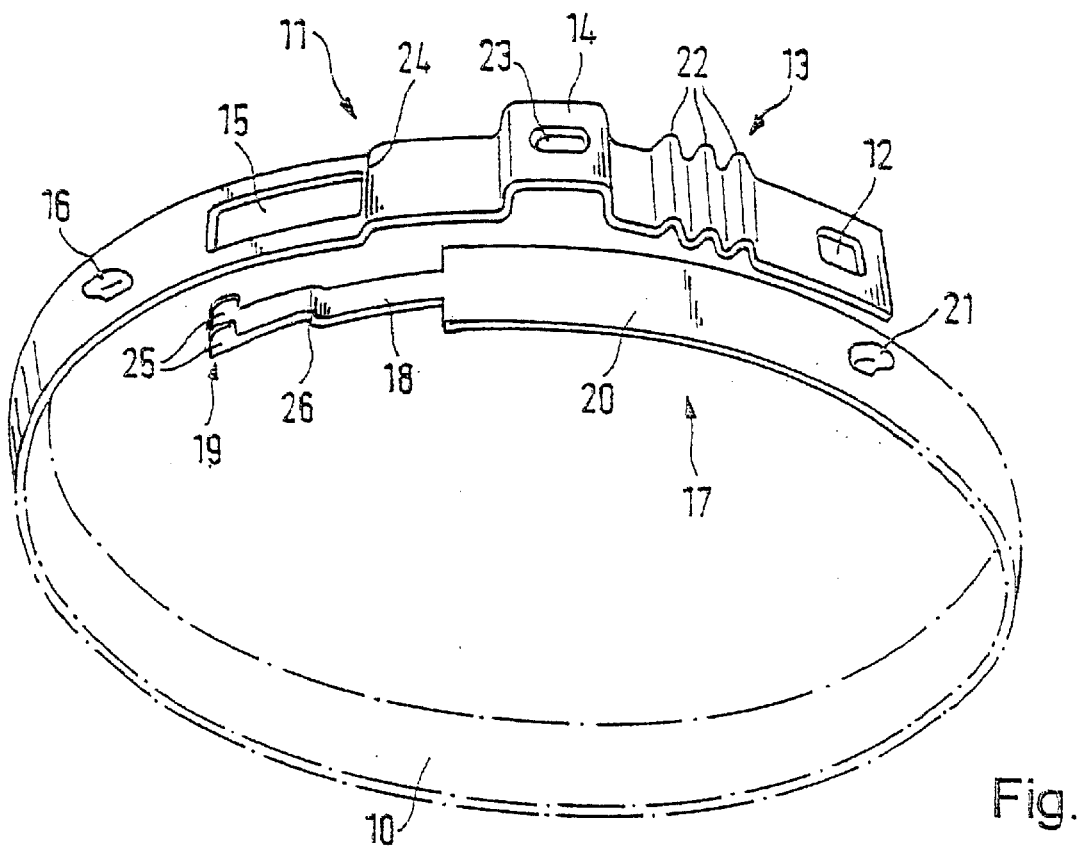

U.S. Pat. No. 4,299,012 A discloses an open hose clamp having mutually overlapping band ends, of which the outer band part comprises, starting from the outer band end, an opening, an ear-shaped formation for tightening the clamp by shortening the band length, and a channel extending in the longitudinal direction of the band, while the inner band part comprises, starting from the inner band end, a tongue, which engages in the channel when the clamp is in the tightened state, an area spanning the area under the ear-shaped formation, and a hook for insertion into the opening.

By virtue of the fact that its inner surface has no gaps or steps in the tightened state and thus supports the hose at all points of the circumference, the known hose clamp has also proven useful for fastening thin, hard hoses on pipe nipples. Tightening is carried out using a formation which in the technical field has become known as the "Oetiker ear" and which, after one or more hooks provided on the inner band part have been inserted into corresponding openings in the outer band part, is constricted with the aid of grippers or a similar tool in order to reduce the diameter of the hose clamp and bring about a sufficient sealing pressure between hose and pipe nipple.

In the case of the known hose clamp, when it is in the tightened state, the tongue provided on the inner band end engages in a tongue channel which is provided in the outer band part and which is formed by forming two parallel slots extending in the band direction and pressing the central section out. This central section closes the tongue channel from outside and prevents the tongue from emerging beyond the circumference of the band.

Similar designs are known from EP 0,697,554 A1, DE 3,818,953 A1 and U.S. Pat. No. 4,711,001 A. In the clamp according to DE 3,818,953 A1, the tongue channel is designed simply as a depression in the outer band part. In the clamp according to U.S. Pat. No. 4,711,001 A, the tongue channel is covered off from the outside by a central part which is formed by two longitudinal cuts and punched free from the band material at the end corresponding to the tongue tip.

U.S. Pat. No. 5,177,836 A and U.S. Pat. No. 5,339,496 A disclose open hose clamps which, near the inner band end, have a guide lug which protrudes outwardly through a slot in the outer band part. In both cases, the inner band part, except for the narrow guide lug, lies on the inner surface of the outer band part.

U.S. Pat. No. 3,981,049 A discloses another open hose clamp which, to permit engagement of a tightening tool, comprises a ladder-like arrangement of openings in the inner band part, and a pulling hook on the outer band part. The openings are accessible to the tightening tool via a slot which is provided in the outer band part and which at the same time serves for guiding a tongue arranged at the inner band end.

A general object of the invention is to at least in part remedy the disadvantages of hose clamps according to the prior art. A more specific object of the invention can be regarded as being to provide a hose clamp which, while being inexpensive to manufacture, can be used in as many different ways as possible.

To achieve this object, the invention provides an open hose clamp with mutually overlapping band ends, of which the outer band part comprises, starting from the outer band end, an opening, an ear-shaped formation for tightening the clamp by shortening the band length, and a channel extending in the longitudinal direction of the band, while the inner band part comprises, starting from the inner band end, a tongue which engages in the channel when the clamp is in the tightened state, an area spanning the area under the ear-shaped formation, and a hook for insertion into the opening, the channel being designed as an open aperture which is wider than the tongue, and the tongue comprising an attachment projecting outwards through the aperture.

In the hose clamp according to the invention, there is none of the friction which occurs between tongue and channel in the prior art and which makes tightening the hose clamp difficult. In addition, the tongue remains accessible from the outside, both in the engaged state and in the tightened state of the clamp, so that the outwardly projecting attachment provided on it is available for handling the clamp and for improving its function.

The attachment on the tongue preferably has substantially the width of the aperture. The resulting guide function ensures that the tongue is aligned with the tongue channel even before tightening and in particular during tightening of the hose clamp and is thus kept centred with respect to the width of the hose clamp.

The attachment can have flanges bent outwards in the radial direction of the hose clamp on both sides of the tongue. This structure gives the attachment high strength, in particular in the circumferential direction.

According to an alternative, the attachment includes an outwardly bent end of the tongue. This embodiment is particularly easy to produce, and the strength can be increased by the fact that the attachment is a fold formed from the material of the tongue.

In any case, it is favourable if the side of the attachment on the tongue remote from the outer band end forms an angle of at most 90° with the circumferential direction of the hose clamp, so that the hose clamp is reliably locked in the engaged state of maximum diameter.

In one embodiment of the invention, the tongue comprises a step which protrudes inwards, as seen from the inner band end, which has a height substantially equal to the thickness of the band material, and which lies in the area of the aperture when the hose clamp is in the tightened state. In this case, the outer band part can comprise, near the aperture, a step which protrudes inwards, as seen from the outer band end, and which has a height substantially equal to the thickness of the band material. These features are advantageous for obtaining a hose clamp which, in the tightened state, has an inner surface which is free from gaps and steps over the whole circumference.

The tightened hose clamp can be easily reopened if the outer band part comprises an outwardly protruding formation arranged on the side of the aperture remote from the outer band end. The formation and the attachment on the tongue on the outer band part constitute points of engagement for a suitable tool.

In order to prevent this tool from slipping, it is advantageous if the side of the formation remote from the outer band end forms an angle of at most 90° with the circumferential direction of the hose clamp. In this case, the hose clamp can be expediently opened with the same gripper-type tool as is used to close the Oetiker ear when tightening the hose clamp.

The production tool can be simplified if the formation is designed as a hook which has the same shape as the hook provided on the inner band part.

In a further embodiment, the outer band part has an undulated band area between the opening and the ear, which band area preferably comprises a plurality of individual waves. This design makes it possible to use the same hose clamp for different diameters. At the same time, the elastic area of the hose clamp is increased. Since the undulation is situated in the outer band part between the opening and the ear, it is also spanned, like the ear itself, by the entire width of the inner band part, so that the continuous closed inner surface of the hose clamp is maintained also in this area.

With a given band material, the modulus of elasticity can be increased or decreased by providing the undulated band area is with a slot or bead in the longitudinal direction of the band.

Advantageously, the attachment forms substantially the whole length of the tongue and is bent back around the edge of the aperture facing the outer band end. In this way, a possibly excessive protrusion of the tongue is avoided, and at the same time an additional means of securing the closed and tightened hose clamp is obtained.

In a further embodiment, the inner band part comprises, in the area adjoining the tongue in the longitudinal direction of the band, two beads into which two beads adjoining the aperture in the outer band part engage when the hose clamp is in the tightened state, and the end of each bead remote from the inner band end merges with decreasing height into the inner surface of the outer band part. In this way it is possible to shorten the length of the tongue and of the overlapping area, thus reducing the overall length of the band.

Figure 2:
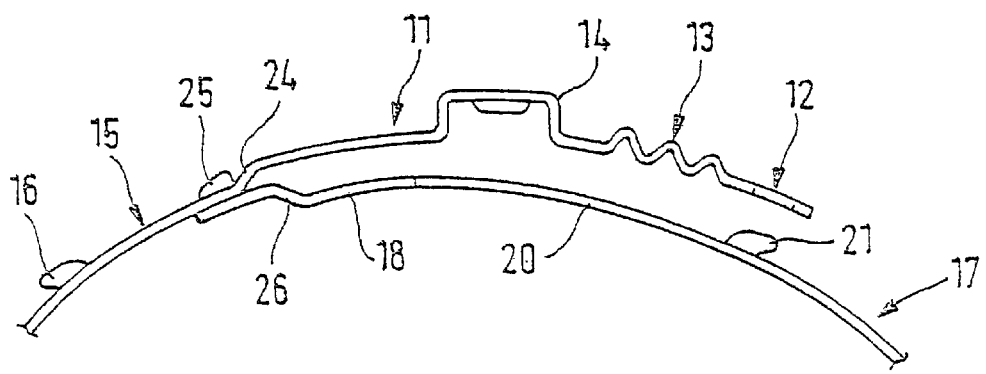
Figure 3:
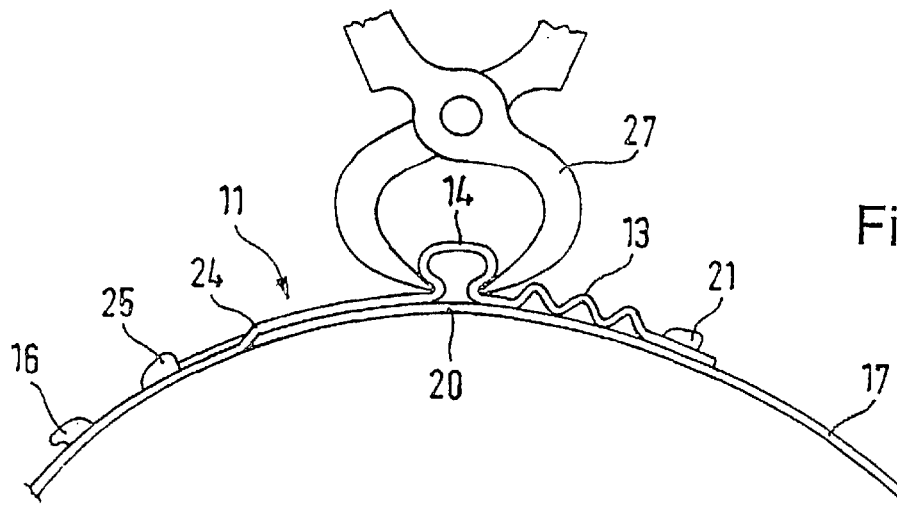
Figure 4:
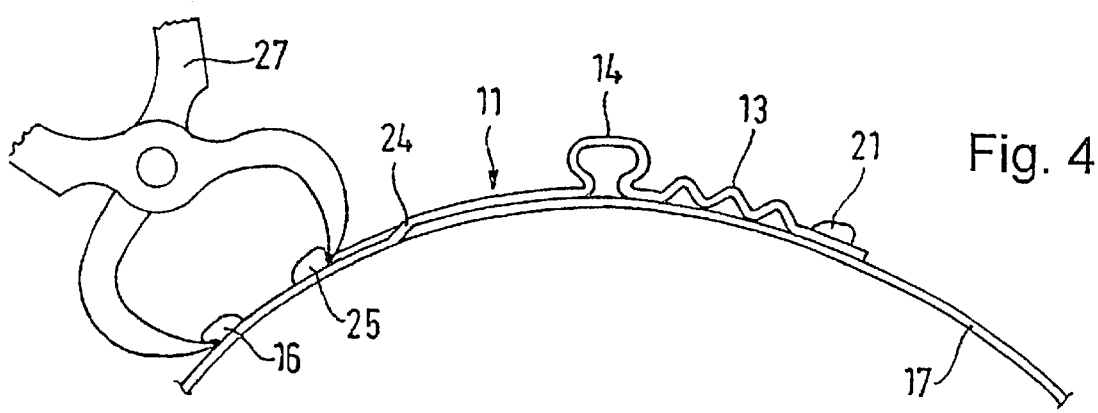
Figure 7:
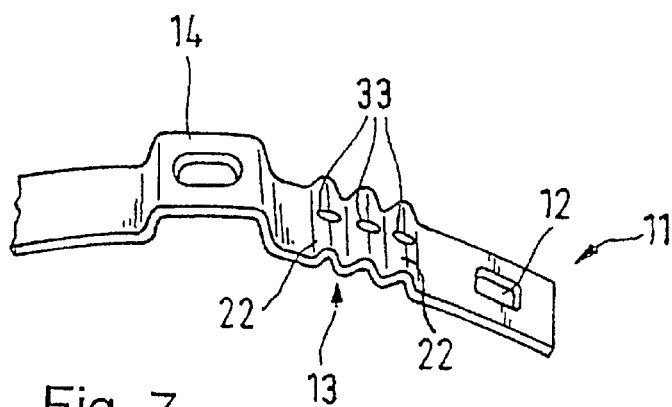
Figure 8:
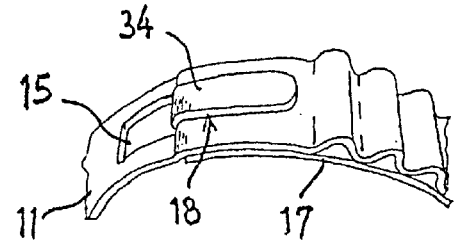
Figure 9:
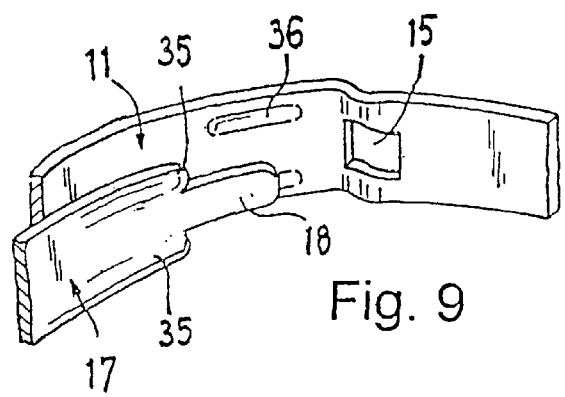
Figure 10:
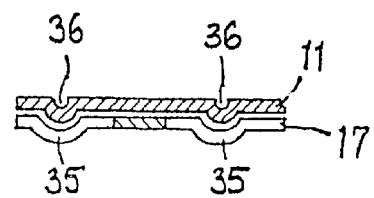

Preferred embodiments of the invention will be explained in more detail below with reference to the drawings, in which:

FIG. 1 is a perspective view of a hose clamp according to an embodiment of the invention in the open state, FIG. 2 is a side view of part of the same hose clamp in the engaged but not yet tightened state, FIG. 3 is a representation, similar to FIG. 2, of the hose clamp in the tightened state, FIG. 4 is a representation, similar to FIG. 3, of the hose clamp when being reopened, FIGS. 5 to 8 are perspective partial representations of hose clamps according to further embodiment of the invention, and FIGS. 9 and 10 are a perspective partial representation and a cross section through a hose clamp according to a further embodiment.

The open hose clamp shown in FIG. 1 is made from a steel band 10 having a width of 10 mm for example and a thickness of 1 mm for example and is bent to give the configuration shown in FIG. 1. The outer band part 11 comprises, starting from the band end, an opening 12, an undulation 13, an outwardly protruding ear-shaped formation (called "Oetiker ear") 14, an aperture 15 extending in the longitudinal direction of the band, and a hook 16. The inner band part 17 comprises, starting from the band end, a tongue 18, with an attachment 19 provided on its end, a smooth band area 20 and a hook 21.

The opening 12 punched in the band material is substantially square, with an edge length approximately equal to half the band width.

In the embodiment shown, the undulation 13 comprises three adjacent waves 22 extending transverse to the longitudinal direction of the band and at intervals of approximately 5 mm and a with wave height of approximately 3 mm. Depending on the dimensions and material of the hose clamp and of the hose and also on the desired sealing pressure, it is possible that, instead of the three waves 22 shown, a larger number or a smaller number of waves, in practice between one wave and nine waves, will be sufficient or necessary to ensure that, in the tightened state of the clamp, there is sufficient reserve as tolerance compensation when the clamp is stretched by typically 30%. An uneven number of waves is expedient for production reasons.

The ear 14, as a whole roughly the shape of an inverted U, has a height of approximately 5 mm and a length of approximately 10 mm in the longitudinal direction of the band. A strengthening bead 23 is punched into the upper web of the ear 14.

The aperture 15 lies symmetrically with respect to the mid-line of the band and, in the embodiment shown, has a width of approximately 5 mm and a length of approximately 10 mm. At the end of the aperture 15 facing the ear 14, a step 24 is formed in the band material, which step protrudes inwards, as viewed from the outer band end, and which has a height corresponding substantially to the thickness of the band 10.

The hook 16 is formed by placing a short cut extending transverse to the band direction and deflected at its two ends in the direction of the outer band end, and by pressing out the band material lying in front of this cut, as viewed from the outer band end. As a result of this production procedure, the hook 16 has, as viewed from the outer band end, a roof surface which rises in an arch and is contiguous with the band material at the beginning and on the sides and which, on its side remote from the outer band end, forms an undercut and thus as a whole constitutes a grip surface which extends at an angle of less than 90° to the circumferential direction of the band 10.

The tongue 18 provided on the inner band part 17 has a slightly narrower width than the aperture 15.

In the embodiment of FIG. 1, the attachment 19 on the tongue end consists of two outwardly bent flanges 25 which extend in the circumferential direction and whose height corresponds to the extent by which the tongue 18 is reduced compared to the full width of the band 10. As is shown, the flanges 25 are rounded at the outermost tongue end, whereas they are slightly undercut at the side facing the tongue root, so that the surface defined on this side forms an angle of slightly less than 90° with the circumferential direction of the band.

Approximately at the midway point of the length of the tongue 18, a step 26 is formed in said tongue 18, which step 26 protrudes inwards, as viewed from the inner band end, and in terms of its height corresponds substantially to the thickness of the band 10.

In the embodiment of FIG. 1, the tongue 18 has a length of approximately 20 mm, while the length of the flanges 25 measured in the circumferential direction is approximately 4 mm.

The hook 21 is formed in the same way as the hook 16 by cold-forming (deep-drawing) and has the same shape, but it points in the opposite direction. In the hook 21 too, the side remote from the inner band end is undercut and forms an angle of less than 90° with the circumferential direction of the hose clamp. Unlike the hose clamps according to U.S. Pat. No. 4,299,012 A and U.S. Pat. No. 4,711,001 A, a single hook 21 is used for introducing into the opening 12, for tightening and closing of the clamp and for taking up the holding forces in the closed state. In this way, a shortening of the overall band length is achieved, with a corresponding saving in material.

In the engaged state shown in FIG. 2, the hook 21 engages in the opening 12, the undercut surface of the hook 21 bearing on the edge of the opening 12 facing the outer band end. In this state, the attachment 19 on the tongue 18, formed by the two flanges 25, engages in the aperture 15.

To tighten the hose clamp, the ear 14 is constricted by means of the grippers 27 indicated in FIG. 3, as a result of which the hose clamp is reduced in its circumference. In this tightening procedure, the inner edge of the opening 12 which faces the outer band end is drawn firmly into the hook 21, while the tongue 18 is moved through the aperture 15 at least so far that the step 26 formed in the tongue 18 is displaced outwards above the step 24 provided at the start of the aperture 15. The effect of the two steps 24, 26 is that, in the tightened state shown in FIG. 3, the inner surface of the hose clamp is continuously smooth and without continuous recesses, depressions or projections transverse to the band direction, so that a uniform pressure is exerted on the hose (not shown) over the entire circumference.

The effect of the attachment 19 provided at the end of the tongue 18 is that the tongue 18 is already held in the aperture 15 in the loosely engaged state shown in FIG. 2, and in particular during the tightening procedure. This ensures that the two band parts 11, 17 cannot move relative to one another transverse to the band direction.

When tightening the hose clamp, the waves 22 can be drawn apart. This effect not only has an influence on the elasticity of the hose clamp but also affords the advantage that the same hose clamp can be used for different nominal diameters, given a suitable length of the aperture 15 and of the tongue 18.

As is shown in FIG. 4, the tightened hose clamp can be opened by means of the same grippers 27 which were used for tightening being applied with their two jaws on the attachment 19 of the tongue 18 and on the hook 16 provided on the outer band part. In this procedure, using the elasticity of the undulation 13 and/or of the ear 14, the opening 12 is disengaged from the hook 21 so that the hose clamp can be released and removed.

Figure 5:
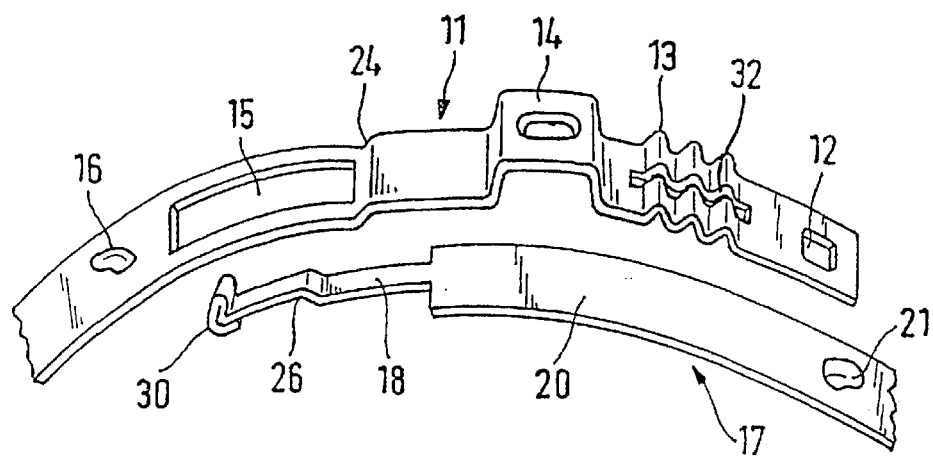

The hose clamp shown in FIG. 5 differs from the embodiment of FIGS. 1 to 4 in that the attachment 30 provided at the end of the tongue 18 consists of the end of the tongue 18 being bent out in a hook shape. As is shown, this hook-shaped end is strengthened by being folded back on itself, the band material extending a short distance parallel to the tongue end pointing in the circumferential direction. The resulting thickening of the tongue end is taken up by a step 26 formed in the tongue 18, so that it does not protrude inconveniently inwards in the tightened state of the hose clamp.

The hook-shaped attachment 30 in the embodiment of FIG. 5 has the same function as the two flanges 25 in the hose clamp of FIGS. 1 to 4. It serves on the one hand to guide the tongue 18 inside the aperture 15 and on the other hand to release the tightened hose clamp with the aid of the grippers 27. In order to avoid slipping of the respective jaw of the gripper, the hook-shaped attachment 30 is bent in such a way that its surface remote from the inner band end forms an angle of less than 90° with the circumferential direction of the hose clamp.

Figure 6:
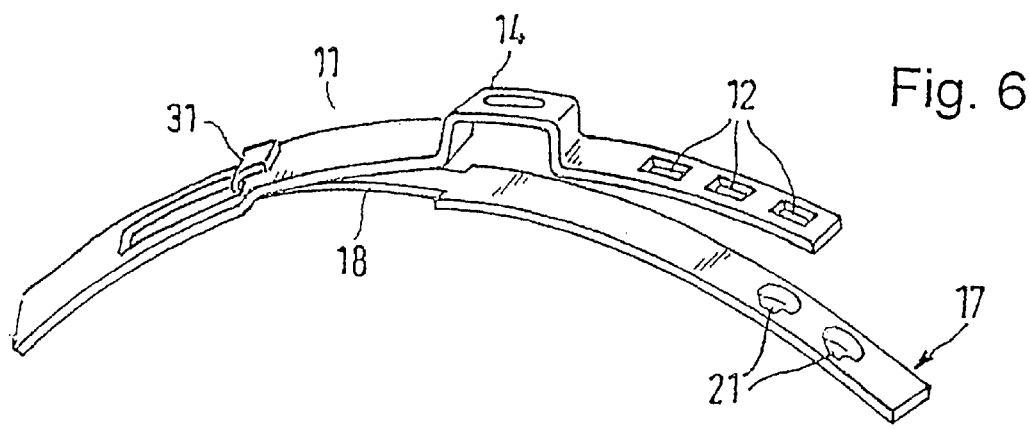

In the further variant according to FIG. 6, the attachment 31 provided on the tongue 18 consists of the end of the tongue being bent back substantially through 180° in a U shape and is used not only to guide the tongue 18 inside the aperture 15 but also to hook itself, in the engaged state of the hose clamp, on the edge of the aperture 15 situated in the area of the step 24 and thereby to secure said engaged state.

The hose clamp according to FIG. 6 also differs from that of FIGS. 1 to 5 in that the outer band part 11 has three openings 12 instead of one, and the inner band part 17 has two hooks 21 rather than one. The distance between the two hooks 21 is equal to the distance between the openings 12. The fact that two hooks 21 engage in two of the three openings increases the overall holding force of the hose clamp in the tightened state. Moreover, because of the fact that more openings 12 are provided than there are hooks 21, the hose clamp can be used for different diameters, i.e. for two different diameters in the embodiment shown.

The same possibility of providing more openings 12 and more hooks 21 also applies to the hose clamps according to FIGS. 1 to 5.

In FIG. 6, it is further assumed that the hose clamp has no undulation, in contrast to that of FIGS. 1 to 5.

In the hose clamp shown in FIG. 5, the band area provided with the undulation 13 is provided with a slot 32 which extends in the circumferential direction and which reduces the effective width of the band 10 in this area, thereby increasing the elasticity of the undulation 13.

The opposite effect can be achieved by means of the waves 22 according to FIG. 7 being shaped with beads 33, as a result of which the entire undulation 13 is less resilient.

In the case of a longer tongue, such as is necessary for overcoming large diameter changes during tightening, it can happen that the tongue protruding through the aperture juts out. To avoid this, the part 34 of the tongue 18 which is guided through the aperture 15 and forms the above mentioned attachment is bent back around that edge of the aperture 15 directed towards the outer band end, in accordance with the embodiment in FIG. 8. This at the same time affords an additional means of securing the closed and tightened hose clamp. In FIG. 8, for reasons of simplicity, the hose clamp is shown without an ear.

In the embodiment of FIGS. 9 and 10, lateral, inwardly projecting beads 35 are formed in the inner band part 17 adjacent to the tongue 18, into which beads there engage, in the tightened state of the clamp, likewise inwardly projecting beads 36 which are formed in that area of the outer band part 11 adjacent to the aperture 15. The beads 35, 36 guide the tongue 18 during closing and tightening of the clamp, so that the tongue 18 and the aperture 15 need be only approximately half as long as in the embodiment of FIG. 1.

At their ends directed away from the tip of the tongue 18, the beads 35 merge steplessly with decreasing height into the smooth inner surface of the inner band part 17 in order to avoid steps which would adversely affect the tightness.

The short length of the tongue 18 means that the band length required to generate a gapless and stepless inner surface of the hose clamp is correspondingly short, thereby reducing the overall band length.

In FIGS. 9 and 10, for reasons of clarity, the attachment which is provided on the tongue 18 and which can have one of the forms described with reference to FIGS. 1 to 6 is not shown.

What is claimed is:

1. An open hose clamp formed of a band having an inner band end and an outer band end overlapping said inner band ends, comprising and outer band part which includes, starting from said outer band end, an opening, an ear-shaped formation for tightening the clamp by shortening the length of said band, and a channel extending in the longitudinal direction of said band, and an inner band part which includes, starting from said inner band end, a tongue which engages in said channel when the clamp is in a tightened state, an area spanning the area under said ear-shaped formation, and a hook for insertion into said opening, wherein said channel is formed as an open aperture which is wider than said tongue and said tongue comprises an attachment projecting outwards through said aperture.

2. The clamp of claim 1, wherein said attachment on said tongue has a width substantially equal to the width of said aperture.

3. The clamp of claim 1, wherein said attachment on said tongue includes a pair of flanges which are bent outwards in the radial direction of the clamp on both sides of said tongue.

4. The clamp of claim 1, wherein said attachment on said tongue includes an outwardly bent end of said tongue.

5. The clamp of claim 1, wherein said attachment on said tongue includes a fold formed from the material of said tongue.

6. The clamp of claim 1, wherein the side of said attachment on said tongue remote from said outer band end forms an angle of at most 90° with the circumferential direction of the clamp.

7. The clamp of claim 1, wherein said tongue comprises a step which protrudes inwards, as seen from said inner band end, which has a height substantially equal to the thickness of the band material, and which lies in the area of said aperture when the clamp is in its tightened state.

8. The clamp of claim 1, wherein said outer band part comprises, near the end of said aperture facing said outer band end, a step which protrudes inwards, as seen from said outer band end, and which has a height substantially equal to the thickness of the band material.

9. The clamp of claim 1, wherein said outer band part comprises an outwardly protruding formation arranged on a side of said aperture remote from said outer band end.

10. the camp of claim 3, wherein the side of said formation remote from said outer band end forms an angle of at most 90° with the circumferential direction of the clamp.

11. The clamp of claim 3, wherein said formation is formed as a hook.

12. The clamp of claim 11, wherein said hook formed by said formation has the same shape as said hook provided on said inner band part.

13. The clamp of claim 1, wherein said outer band part has an undulated band area between said opening and said ear-shaped formation.

14. The clamp of claim 13, wherein said undulated band area comprises a plurality of waves.

15. The clamp of claim 13, wherein said undulated band area is provided with a slot extending in the longitudinal direction of said band.

16. The clamp of claim 13, wherein said undulated band area is provided with a band extending in the longitudinal direction of said band.

17. The clamp of claim 3, wherein said attachment forms substantially the whole length of said tongue and is bent back around an edge of said aperture facing said outer band end.

18. The clamp of claim 13, wherein said inner band part comprises, in the area adjoining said tongue in the longitudinal direction of said band, two beads which are engaged, in a tightened state of the clamp, by two beads adjoining said aperture in said outer band part.

19. The clamp of claim 13, wherein the end of each bead remote from said inner band end merges with decreasing height into the inner surface of said inner band part.

* * * * *